US012562299B2

(12) United States Patent
Hoppe et al.

(10) Patent No.: US 12,562,299 B2
(45) Date of Patent: Feb. 24, 2026

(54) ELECTRICAL DEVICE HAVING A TANK WITH A CONVEX BULGING PORTION

(71) Applicant: Siemens Energy Global GmbH & Co. KG, Munich (DE)

(72) Inventors: Jens Hoppe, Schwarzenbruck (DE); Karsten Loppach, Nuremberg (DE); Christian Reichert, Nuremberg (DE); Thomas Wende, Burgthann (DE); Bilen Özen, Nuremberg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 687 days.

(21) Appl. No.: 17/918,979

(22) PCT Filed: Apr. 9, 2021

(86) PCT No.: PCT/EP2021/059251
§ 371 (c)(1),
(2) Date: Oct. 14, 2022

(87) PCT Pub. No.: WO2021/209325
PCT Pub. Date: Oct. 21, 2021

(65) Prior Publication Data

US 2023/0326649 A1 Oct. 12, 2023

(30) Foreign Application Priority Data

Apr. 14, 2020 (DE) ..................... 10 2020 204 661.1

(51) Int. Cl.
*H01F 27/02* (2006.01)
*H01F 27/32* (2006.01)
*H01F 27/34* (2006.01)

(52) U.S. Cl.
CPC ........... *H01F 27/02* (2013.01); *H01F 27/321* (2013.01); *H01F 27/34* (2013.01)

(58) Field of Classification Search
CPC ......... H01F 27/02; H01F 27/321; H01F 27/34
(Continued)

(56) References Cited

U.S. PATENT DOCUMENTS 8,797,133 B2 8/2014 Murillo et al.
9,478,350 B2 10/2016 Weber et al.

FOREIGN PATENT DOCUMENTS

CN 2814637 Y 9/2006
CN 202678031 U 1/2013
(Continued)

*Primary Examiner* — Lincoln D Donovan
(74) *Attorney, Agent, or Firm* — Laurence A. Greenberg; Werner H. Stemer; Ralph E. Locher

(57) ABSTRACT

An electrical device for connection to a high-voltage system has a tank filled with insulating fluid. The tank has at least one side wall forming a planar wall portion and a radially outwardly curved bulging/convex portion, which increases the interior volume of the tank. An active part with a core and at least one winding is arranged in the tank. A winding barrier system encloses one or more windings. The convex bulging portion has a shape that complements a portion of the winding barrier system and lies opposite it at a distance, such that the electrical device has increased dielectric strength. An additional barrier is disposed between the winding barrier system and the convex bulging portion which has a round portion, bent radially outwards and facing the convex bulging portion, and two planar flat portions, which at an axial crease respectively extend out of the round portion towards a free end.

10 Claims, 2 Drawing Sheets

(58) Field of Classification Search
USPC .................................................. 336/90, 84 R
See application file for complete search history.

(56) References Cited

FOREIGN PATENT DOCUMENTS

| | | | | |
|---|---|---|---|---|
| CN | 103069515 | A | 4/2013 | |
| CN | 104575988 | A | 4/2015 | |
| CN | 205828113 | U | 12/2016 | |
| CN | 208706393 | U | 4/2019 | |
| EP | 3076409 | A1 | 10/2016 | |
| JP | S54105731 | A | 8/1979 | |
| JP | 2001023831 | A | 1/2001 | |
| WO | WO-2015062838 | A1 * | 5/2015 | ........... H01F 27/363 |
| WO | WO-2022051926 | A1 * | 3/2022 | ........... H01F 27/321 |

* cited by examiner

ELECTRICAL DEVICE HAVING A TANK WITH A CONVEX BULGING PORTION

FIELD AND BACKGROUND OF THE INVENTION

The invention relates to an electrical device for connection to a high-voltage system comprising a tank filled with insulating fluid, which has at least one side wall, which forms a planar wall portion and a radially outwardly curved convex bulging portion, which increases the interior volume of the tank and extends between two axial edges, an active part, which is arranged in the tank and has a core and at least one winding enclosing a portion of the core, and at least one winding barrier system, which encloses one or more windings, wherein the convex bulging portion is formed with a shape that complements a portion of the winding barrier system and lies opposite it at a distance.

An electrical device of this kind is known from practice. For example, transformers have an active part that has a magnetizable core formed from sheets of iron that lie on another by way of their flat sides. In this case, the core forms a closed magnetic circuit. The sheets of iron are pressed to one another using a pressing frame. In the case of three-phase active parts, the core forms for example three limbs, which are connected to one another via a lower and upper yoke. In this case, each core limb is surrounded by an inner secondary winding and an outer primary winding. The core and said windings are arranged concentrically with respect one another.

Due to the increase in power and voltage, the active part increases in size, wherein the required transport sizes of the tank often have to be kept constant. For this reason, the distance between the active part and the tank becomes ever smaller. However, this distance may not fall below a minimum distance depending on the required operating voltage.

In order to ensure this minimum distance, use is made of what are known as tanks with a convex bulging portion, in which the tank has side walls that form what are known as convex bulging portions. These convex bulging portions are located opposite the windings so that the distance between the winding and the tank wall does not fall below the required minimum distance. However, such tanks with a convex bulging portion have the disadvantage that high electrical field strengths can occur due to the corners arising in the transition between the convex bulging portion and the flat portion of the side wall.

SUMMARY OF THE INVENTION

It is therefore the object of the invention to improve the reduction of the field in the edge region and thus prevent an electrical flashover.

The invention achieves this object by the fact that between the winding barrier system and the convex bulging portion there is arranged an additional barrier, which has a round portion, facing the convex bulging portion and bent radially outwards, and two planar flat portions, which at an axial crease respectively extend out of the round portion towards a free end.

According to the invention, an additional barrier is arranged between the convex bulging portion of the side wall in order to divide the free oil path. The additional barrier has a round portion, which is bent radially outwardly similar to the convex bulging portion. Two planar flat portions, which each extend in a plane such that a sharp bend, a splay or in other words a crease that runs in the axial direction is formed between each flat portion and the round portion, are provided on both sides of the round portion. This crease extends in the axial direction, whereas the round portion is bent radially outwardly like the convex bulging portion of the side wall and is thus rounded. The two flat portions of the additional barrier extend from the round portion to the free ends thereof.

It has been found that an additional barrier that is designed according to the invention advantageously electrically divides the free oil path—in particular at the bending points of the side wall. Within the context of the invention, therefore, provision is made of an electrical device whose active part can be designed for higher powers, that is to say higher voltages or higher currents, without having to deviate from the required transport sizes.

The electrical device according to the invention is a transformer or an inductor, for example. If the electrical device is a transformer, it has one or more pairs of windings that are inductively coupled to one another. The two windings of a winding pair are arranged concentrically with respect one another, for example, wherein one winding is a low-voltage winding and the other winding is a high-voltage winding. A core limb extends through both windings as a core portion.

The winding barrier system is advantageously formed from a series of barriers, which delimit oil channels between them so that there is an improved reduction of the electrical field in the radial direction. In this case, the barriers are formed from pressboard. However, such barrier systems are known to a person skilled in the art, with the result that an illustration of the exact structure of such a barrier system can be omitted at this point. The barrier system preferably has a circular-cylindrical outer contour. The additional barrier, which is advantageously produced from an electrically non-conductive material, for example from pressboard, extends between this barrier system. In a deviation therefrom, the additional barrier is also produced from paper or cardboard.

The round portion is advantageously formed with a shape that complements the convex bulging portion. According to this advantageous development of the invention, the round portion is at a constant distance from the rounded convex bulging portion that is bent outwards.

There are further advantages if the flat portions each extend parallel to the planar wall portion of the side wall. In the case of a parallel orientation of the flat portions with respect to the flat portion of the side wall of the electrical device according to the invention, the electrical field at the edges of the side wall is still further divided.

In another advantageous variant of the invention, the additional barrier is supported by means of at least one lid segment arranged at a distance from the winding barrier system and by means of a support band at a distance from the winding barrier system and the convex bulging portion. Within the context of the invention, the additional barrier is supported by means of a support band and with the aid of lid segments. The lid segments, which are generally installed in the tank anyway, are used to support the additional barrier. The support band, which is designed for example as a flat band, extends around the additional barrier system such that it bears against the outer contour thereof by way of its flat side, for example. From there, it is wound around the round portion of the additional barrier system, wherein suitable passage openings or slots are provided in the additional barrier. Within the context of the invention, the support band consists of cardboard, paper or another shapeable pressboard.

Provision is expediently made of at least one adjuster, which extends between the winding barrier system and the flat portion of the additional barrier. The adjuster, which can also be referred to synonymously as a spacer, likewise consists of pressboard, cardboard or paper and is used to align the respective flat portion of the additional barrier whose free end could otherwise be aligned freely.

In this case, the adjuster is expediently secured to the winding barrier system via the support band. Lines made of cardboard, paper or another non-conductive material are used at the free end of each flat portion for securing to the respective flat portion, for example. To this end, the adjuster expediently has lead-through openings. Each adjuster is provided with slots through which the support band can be fed for the purpose of intake and for lead-through.

The winding barrier system advantageously has a circular-cylindrical outer contour and the convex bulging portion delimits a portion of a circular hollow cylinder, wherein the winding barrier system and the convex bulging portion are arranged concentrically with respect to one another. As has already been stated further above, the windings are of cylindrical design and are arranged concentrically with respect one another and with respect to the core limb surrounded thereby. According to this development of the invention, this also relates to the winding barrier system, which then has an effect on the convex bulging portion due to the complementary design in terms of shape. This is then a segment or portion of a circular cylinder.

According to an expedient development with respect thereto, the convex bulging portion and the round portion each delimit a portion of a hollow cylinder, wherein the hollow cylinders have different radii and the convex bulging portion and the round portion are arranged concentrically with respect to one another. According to this variant, what has been stated further above with respect to the convex bulging portion and the winding barrier system also applies to the round portion and the convex bulging portion.

It may also be advantageous when the two edges of the side wall, between which the convex bulging portion extends, and the two creases of the additional barrier, between which the round portion extends, span the same angle with respect to center point. dr

BRIEF DESCRIPTION OF THE FIGURES

Further expedient configurations and advantages of the invention are the subject of the following description of exemplary embodiments of the invention with reference to the figures of the drawings, wherein the same reference signs refer to components with the same effect and wherein.

DETAILED DESCRIPTION OF THE INVENTION

Figure 1:
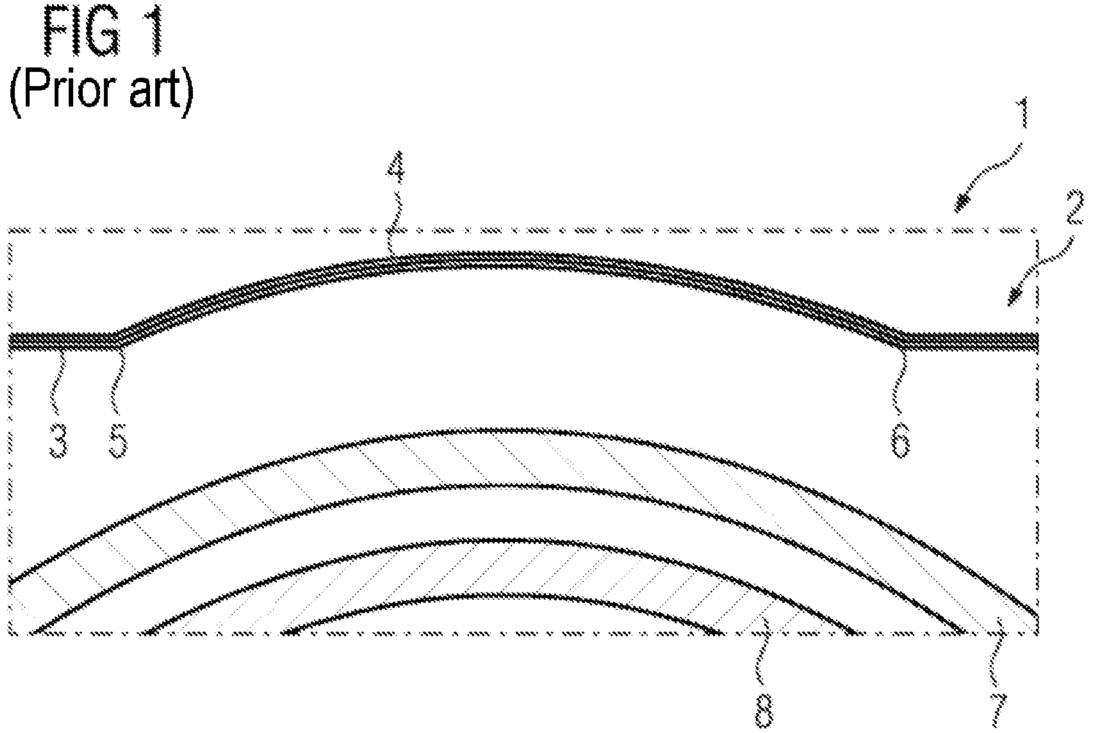
FIG 1 (Prior art)
FIG. 1 shows a sectional plan view of an electrical device according to the prior art.
Figure 4:
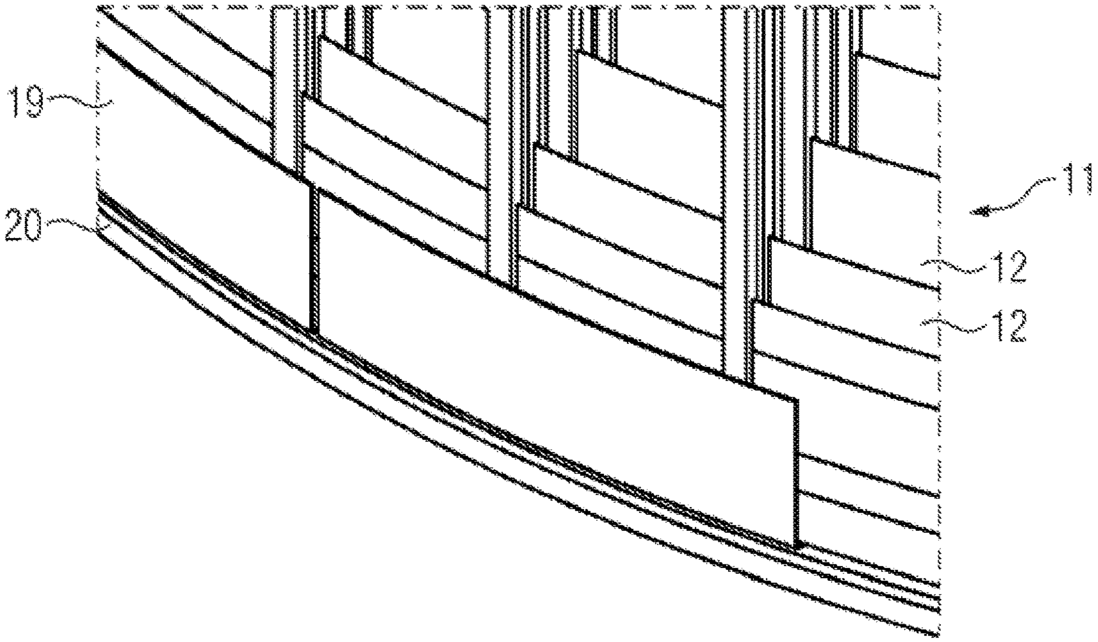

FIG. 1 shows an exemplary embodiment of an electrical device 1 according to the prior art in a cut-away cross-sectional view from above. The electrical device 1 shown is embodied as a power transformer 1, which has a tank filled with an insulating fluid, of which only one side wall 2 can be seen. The side wall 2 has a flat wall section 3 and a radially outwardly curved convex bulging portion 4, which increases an interior volume of the tank. The convex bulging portion is arranged between two axial edges 5 and 6 that extend in an axial direction. In FIG. 4, the axial direction goes into the plane of the drawing or comes out of the plane of the drawing.

Inside the tank, which is illustrated only partly by way of the side wall 2 thereof, a high-voltage winding 7 and a low-voltage winding 8 are arranged, these being arranged concentrically with respect one another and with respect to a core limb that is not illustrated in the figures.

It can be seen that the convex bulging portion 4 is outwardly curved in a manner that increases the internal volume of the tank such that a required minimum distance remains between the high-voltage winding 7 and the side wall 2 and high electrical field strengths with voltage flashovers are prevented within the transformer 1. As has already been stated further above in the description, however, high electrical field strengths can occur at the edges, which are illustrated as corners in the sectional view shown, such that the operating voltage of the power transformer cannot be further increased without voltage flashovers occurring at said corners or splays; these voltage flashovers would irreparably damage the electrical device.

Figure 2:
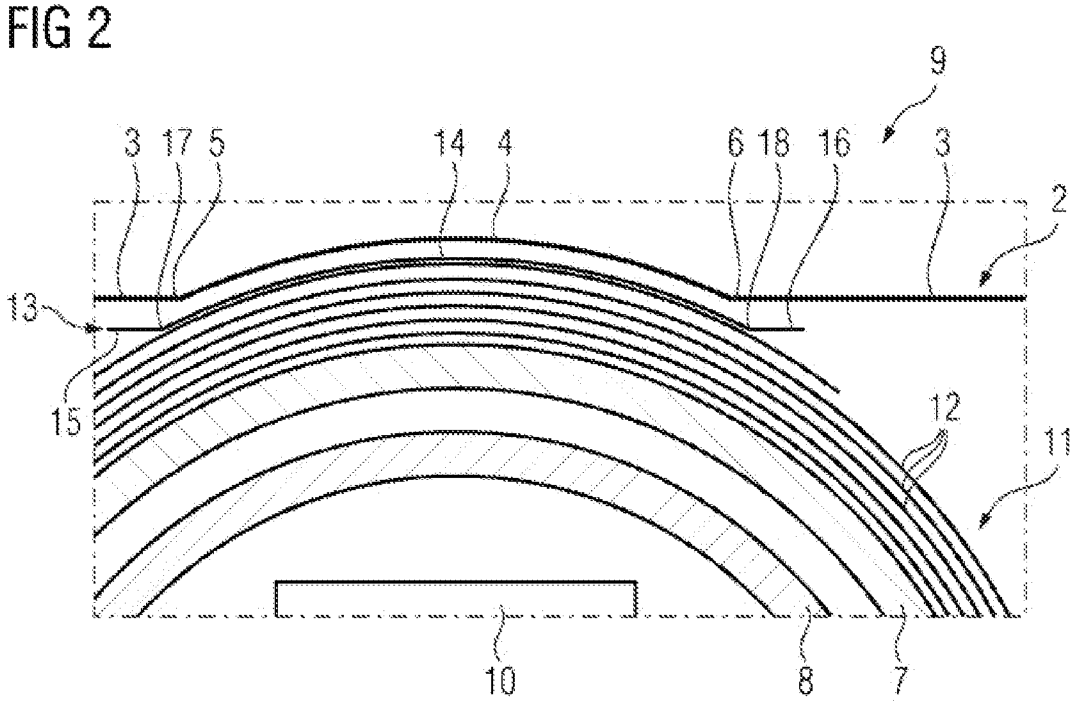
FIG. 2 shows an exemplary embodiment of the electrical device according to the invention in a sectional plan view.

FIG. 2 shows an exemplary embodiment of the electrical device 9 according to the invention, which is again embodied as a transformer 9. The transformer 9, illustrated only partly in a sectional plan view, has a tank, of which only one side wall 2 is illustrated in FIG. 2, which again has a flat wall section 3 and a radially outwardly curved convex bulging portion 4. In this case, the old charging/convex portion 4 extends between edges 5 and 6 that extend in the axial direction, these being illustrated as corners 5 and 6 in FIG. 2 due to the selected sectional illustration.

The transformer 9 is filled with an insulating fluid, for example a mineral oil or an ester liquid. Arranged in the interior of said transformer is a magnetizable core, of which only one core limb 10 can be seen in FIG. 2. The core limb 10 is surrounded concentrically by a low-voltage winding 8 and a high-voltage winding 7. The two windings 7 and 8 are enclosed in turn by a barrier system 11, which consists of individual barriers 12 that are radially spaced apart from one another. Oil channels, which increase the electric strength of the transformer 9, are formed between the barriers 12 of the barrier system 11.

Furthermore, it is possible to identify an additional barrier 13, which has a round portion 14, which faces the convex bulging portion 4 and from which two flat portions 15 and 16 each extend towards a free end. The round portion 14 is formed with a shape that complements the circular-cylindrical outer contour of the winding barrier system 11 and with a shape that complements the convex bulging portion 4 of the side wall 2. The flat portions 15 and 16 extends substantially parallel to the planar wall portions 3 of the side wall 2. In other words, the flat portions 15 and 16 extend from the axial creases 17 and 18, which are again illustrated as corners in FIG. 2 due to the two-dimensional illustration.

In the exemplary embodiment shown in FIG. 2, the round portion 14 transitions in each case into one of the flat portions 15 and 16 at said axial creases 17 and 18. In other words, the additional barrier 13 is formed in one piece. In the exemplary embodiment illustrated, it consists of pressboard, like the barriers 12 of the winding barrier system 11. However, in a deviation therefrom, other electrically non-conductive materials can also be used to produce the additional barrier. For example, the additional barrier consists of cardboard, paper or also even of an electrically non-conductive plastic.

Figure 3:
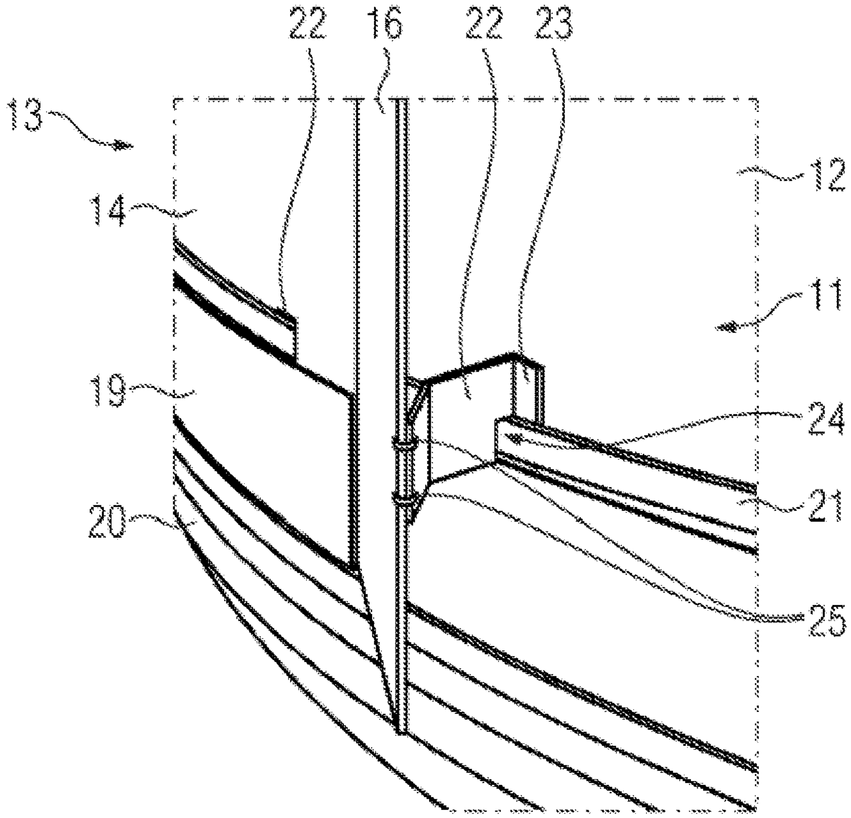
FIG. 3 shows the securing of the additional barrier to the winding barrier system and FIG. 4 shows the securing of the lid segment and the segments of the winding barrier system in a perspective view.

FIG. 3 shows the securing of the additional barrier 13 in more detail. It can be seen that lid segments 19 are used to keep said additional barrier at a distance from the outer barrier 12 of the winding barrier system 11. The lid segments 19, which are also round in design, are formed in an L-shaped manner in a longitudinal sectional view and are clamped to a lower securing system 20 at the shorter lower end thereof. The securing system 20 is also used to secure the barriers 12 of the winding barrier system 11 and in this case is arranged on the bottom of the tank. Longitudinal slots, through which a respective flat portion 16 of the additional barrier 13 extends, are formed between two lid segments 19 that are arranged next one another.

In addition to the lid segments, provision is made of a support band 21, which consists of cardboard and is embodied as a flat band. The support band lies by way of its flat side on the outer contour of the winding barrier system 11 and from there is led through a slot 22 in the round portion 14 of the additional barrier 13 such that the support band 21 surrounds the round portion from the outside and thus ensures additional support of the additional barrier 13.

Furthermore, it is possible to identify a spacer or adjuster 22, which has a bent lower-end portion 23 by way of which it lies on the outer contour of the winding barrier system 11. The support band is led via the lower-end portion such that the lower-end portion 23 is pressed against the winding barrier system 11 by the support band 21. An adjuster slot 24, through which the support band 21 is led, is formed in the lower region of the adjuster 22.

Provided on the end of the adjuster 22 facing away from the lower-end portion 23 are clearance holes, which are arranged flush with the clearance holes in the flat portion 16 of the additional barrier 13. A securing line 25 made of paper is led through the clearance holes of the adjuster 22 and the clearance holes of the flat portion 16 such that the adjuster 22 is secured to the flat portion 16. In the context of the invention, the securing line can also be made from another electrically non-conductive material. The adjuster 22 is formed so as to be dimensionally stable such that it ensures fixed and stable orientation of the flat portions 16 with respect to the flat wall sections.

FIG. 4 illustrates the securing of the lid segments 19 to the securing system 20. It is possible to identify in particular the configuration of the lid segments 19 in an L-shaped manner in longitudinal section. It is also possible to identify the inner barriers 12 of the winding barrier system 11 due to a partly transparent illustration.

The invention claimed is:

1. An electrical device for connection to a high-voltage system, the electrical device comprising:

a tank filled with insulating fluid, said tank having at least one side wall with a planar wall portion and a radially outwardly curved convex bulging portion, which extends between two axial edges and increases an interior volume of said tank;

an active part disposed in said tank, said active part having a core and at least one winding enclosing a portion of said core;

at least one winding barrier system enclosing one or more of said windings;

said convex bulging portion having a shape that complements a portion of said winding barrier system and lies opposite said winding barrier system at a spacing distance; and an additional barrier between said winding barrier system and said convex bulging portion, said additional barrier having a round portion facing toward said convex bulging portion and being bent radially outwards, and two planar flat portions respectively extending via an axial crease from said round portion toward a free end.

2. The electrical device according to claim 1, wherein said round portion is formed with a shape that complements the convex bulging portion.

3. The electrical device according to claim 1, wherein each of said flat portions extends parallel to said planar wall portion of said side wall.

4. The electrical device according to claim 1, wherein said additional barrier is supported by way of at least one lid segment arranged at a spacing distance from said winding barrier system and by way of a support band at a spacing distance from said winding barrier system and said convex bulging portion.

5. The electrical device according to claim 1, further comprising at least one adjuster, which extends between said winding barrier system and said flat portion of said additional barrier.

6. The electrical device according to claim 5, wherein said at least one adjuster is secured to said winding barrier system by way of said support band.

7. The electrical device according to claim 5, wherein said at least one adjuster is secured to the respective said flat portion by a securing line.

8. The electrical device according to claim 1, wherein said winding barrier system has a circular-cylindrical outer contour and said convex bulging portion delimits a portion of a circular hollow cylinder, and wherein said winding barrier system and said convex bulging portion are arranged concentrically with respect to one another.

9. The electrical device according to claim 1, wherein said convex bulging portion and said round portion each delimit a portion of a respective hollow cylinder, wherein the hollow cylinders have different radii and said convex bulging portion and said round portion are arranged concentrically with respect to one another.

10. The electrical device according to claim 9, wherein, in a plan view, said two axial edges of said side wall and said two creases of said additional barrier span the same angle with respect to a center point.

* * * * *